United States Patent [19]
Perez et al.

[11] Patent Number: 6,015,123
[45] Date of Patent: Jan. 18, 2000

[54] MOUNTING BRACKET FOR A CAMERA BASE

[75] Inventors: Sergio M. Perez, Boynton Beach; Walter N. Yap, Boca Raton, both of Fla.

[73] Assignee: Sensormatic Electronics Corporation, Boca Raton, Fla.

[21] Appl. No.: 09/033,436

[22] Filed: Mar. 3, 1998

[51] Int. Cl.⁷ .......................... A47B 96/06; A47G 29/00; F16M 11/00; A47F 5/00

[52] U.S. Cl. .................. 248/220.1; 248/220.21; 248/201; 248/300

[58] Field of Search ................ 248/220.1, 220.21, 248/221.11, 222.14, 223.31, 224.51, 224.61, 224.8, 225.11, 225.21, 300, 309.1, 248, 247

[56] References Cited

U.S. PATENT DOCUMENTS

| | | | |
|---|---|---|---|
| 675,735 | 6/1901 | Holland | 248/300 |
| 1,171,667 | 2/1916 | Scroth | 248/220.1 |
| 1,219,596 | 3/1917 | Simmons | 248/300 |
| 2,738,540 | 3/1956 | Kramcsak | 248/300 |
| 3,762,696 | 10/1973 | Falk et al. | 269/108 |
| 4,034,535 | 7/1977 | Dustmann | 52/727 |
| 4,459,920 | 7/1984 | Cwik | 108/107 |
| 4,461,134 | 7/1984 | Lowe | 52/732 |
| 4,698,946 | 10/1987 | Wendt | 248/224.8 |
| 4,711,420 | 12/1987 | Cowler et al. | 248/224.8 |
| 4,813,639 | 3/1989 | Midkiff | 248/68.1 |
| 4,918,765 | 4/1990 | Harding | 4/460 |
| 5,094,421 | 3/1992 | Zaccone | 248/220.1 |
| 5,170,977 | 12/1992 | McMillan | 248/300 |
| 5,277,131 | 1/1994 | Fortsch | 108/50 |
| 5,398,902 | 3/1995 | Crowe | 248/300 |
| 5,810,317 | 9/1998 | Macchi | 248/475.1 |
| 5,813,556 | 9/1998 | Onken | 220/4.33 |

FOREIGN PATENT DOCUMENTS

| | | | |
|---|---|---|---|
| 3914-516 | 11/1990 | Germany | 248/248 |

OTHER PUBLICATIONS

PELCO Brochure—"What's Happening at ISC '97—On–Floor CCTV Training: 50 New Products, Pelco. Booth #647."

Primary Examiner—Derek J. Berger
Assistant Examiner—Michael Nornberg
Attorney, Agent, or Firm—Robin, Blecker & Daley

[57] ABSTRACT

A mounting bracket permits mounting a camera base for a video surveillance camera to a variety of different support structures. The mounting bracket includes first and second outside corner panel sections for defining a concave right-angled structure to selectively be fitted to an outside wall corner, first and second planar panel sections for defining a substantially planar structure to selectively be fitted to a planar wall section, first and second inside corner panel sections for defining a convex right-angled structure to selectively be fitted to an inside wall corner, and first and second attachment panel sections to permit attachment of the camera base to the mounting bracket. The first and second outside corner panel sections are connected to the first and second planar panel sections, respectively, which in turn are connected to the first and second inside corner panel sections, respectively, which in turn are connected to the first and second attachment panel sections, respectively. A securing device is insertable into at least the first and second outside corner panel sections or the first and second planar panel sections or the first and second inside corner panel sections to secure the bracket to a support structure surface.

15 Claims, 6 Drawing Sheets

MOUNTING BRACKET FOR A CAMERA BASE

FIELD OF THE INVENTION

This invention relates generally to mounting brackets, and pertains more particularly to a mounting bracket for securing a base for a camera to a variety of different types of support structures.

BACKGROUND OF THE INVENTION

In the video surveillance field, it is well-known to position surveillance cameras in unobtrusive locations high above areas to be monitored. However, positioning a surveillance camera in an unobtrusive location requires a camera support assembly, such as a base to support the camera, and a mounting bracket for attaching and securing the base to a selected support structure, such as a wall, interior or exterior corner, ceiling or pole.

For example, a flat mounting bracket is often used as a base to support a video surveillance camera. The flat mounting bracket can be secured to any type of flat support structure depending on where the customer desires to have the video surveillance camera located. However, a problem arises when, for example, a customer desires to attach the flat mounting bracket to a interior corner of a hallway. Since a flat mounting bracket cannot be easily attached to an interior corner, a triangular-shaped mounting bracket which can fit in a corner is required.

Since there are so many different types of support structures, e.g., the upper section of interior or exterior walls of buildings, inside corners of hallways or outside corners of buildings, ceilings or the tops of roofs as well as poles or columns, a different type of mounting bracket is then needed depending upon the location selected. Since the same bracket cannot be used on a variety of different support structures, a company in the video surveillance field is required to maintain a variety of different types of mounting brackets in inventory to meet the needs of its customers. Maintaining such an inventory increases costs for the video surveillance company as well as possibly inconveniencing the customer if the correct bracket is not initially ordered or provided.

It is, therefore, an object of the present invention to provide a mounting bracket for a camera base that is mountable to a variety of different support structures.

It is a further object of the present invention to provide a mounting bracket for a camera base that has a simple design and is easy to manufacture and install.

SUMMARY OF THE INVENTION

In accordance with the principles of the present invention, the above and other objectives are realized in a mounting bracket for mounting a camera base to a variety of different support structures, such as a flat wall, inside corner or outside corner of a building. The mounting bracket comprises first and second outside corner panel sections for defining a concave right-angled structure to selectively be fitted to an outside wall corner, first and second planar panel sections for defining a substantially planar structure to selectively be fitted to a planar wall section, first and second inside corner panel sections for defining a convex right-angled structure to selectively be fitted to an inside wall corner, and first and second attachment panel sections for engaging the camera base. The first and second outside corner panel sections are connected to the first and second planar panel sections, respectively, which in turn are connected to the first and second inside corner panel sections, respectively, which in turn are connected to the first and second attachment panel sections, respectively. A securing device is insertable into at least the first and second outside corner panel sections or the first and second planar panel sections or the first and second inside corner panel sections to mount and secure the bracket to the surface of the support structure. Attaching pins located on the first and second attachment panel sections can then engage with slots formed in the camera base in order to attach the camera base to the mounting bracket.

As illustrated in the embodiments, the mounting bracket of the present invention is also mountable and securable to a variety of different camera bases for supporting a camera. In another embodiment, the mounting bracket may be combined with a camera base to form a one-piece camera mount.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

FIGS. 1–6 show mounting means or a mounting bracket 10 in accordance with the principles of the present invention. In the present illustrative case, the mounting bracket 10 can be mounted to a variety of shaped structures and surfaces. The versatility of placement of the mounting bracket 10 on a support structure or surface is based upon its angled multi-sectioned structure.

Figure 1:
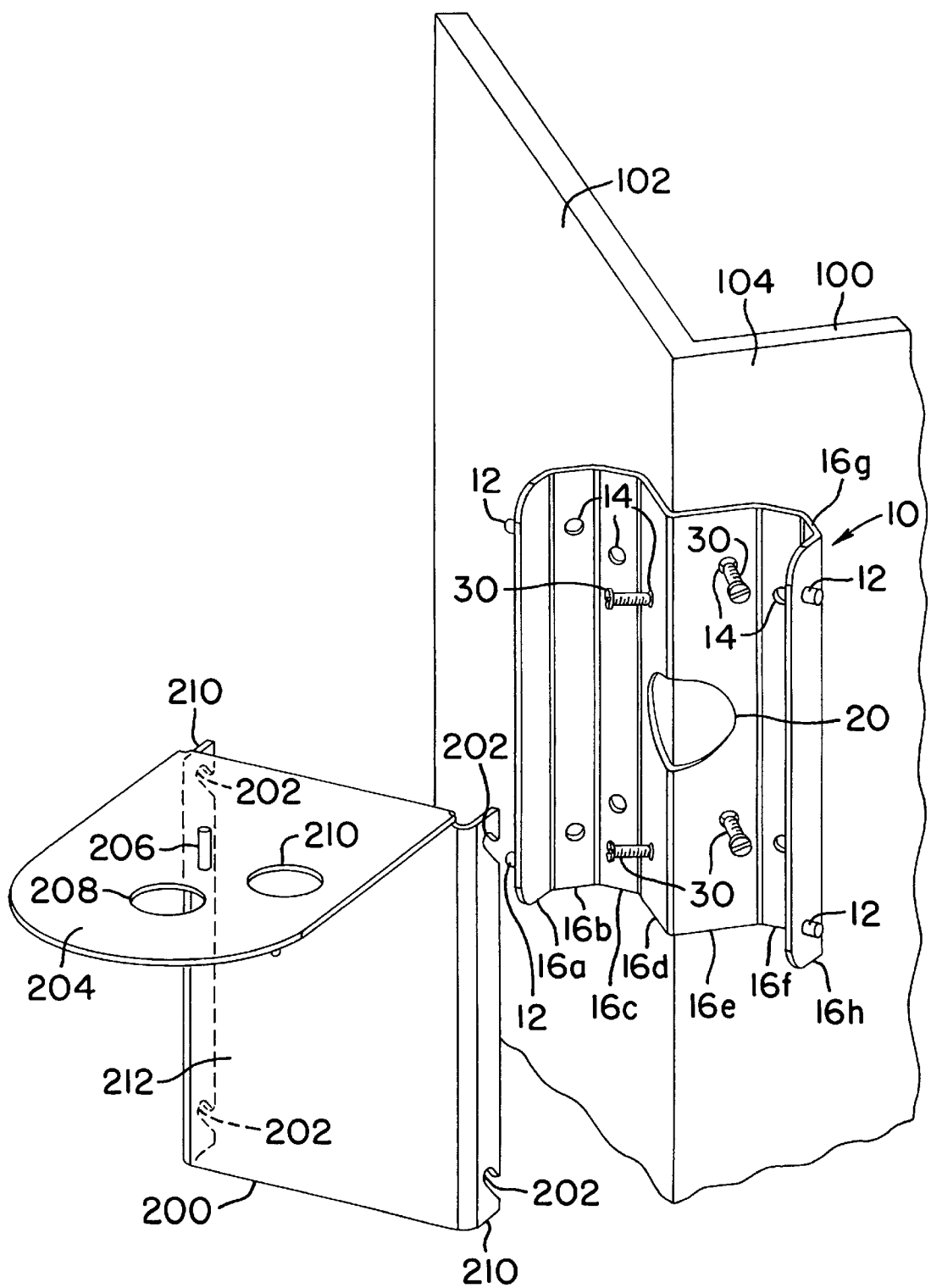
FIG. 1 shows a perspective view of a mounting bracket of the present invention along with a camera base positioned on an outside corner of a support structure.

With reference to FIG. 1, the mounting bracket 10 comprises a plurality of rectangular-shaped panel sections 16a–16h. Each panel section is oriented in a respective vertical direction. That is, each panel section, as illustrated in FIG. 1, is oriented in a respective direction that is normal to a common horizontal plane. Each panel section is also of a uniform length but varies in width depending on the location of the panel section in the bracket 10.

As illustrated in FIG. 1, each of panel sections 16a–16c and 16f–16h has the same width, while first means or first and second outside corner panel sections 16d and 16e located in the middle of the bracket 10 are somewhat larger in width. This larger width of the panel sections 16d and 16e helps to provide strength for the mounting bracket 10 in supporting the camera base, which in turn, supports a video surveillance camera (not shown) when the mounting bracket 10 is positioned, for example, on an outside wall corner as shown in FIG. 1.

Further as shown in FIG. 1, outside corner panel sections 16d and 16e are joined together at a 90° angle to form a concave right-angled structure. Panel section 16c extends outward from and is joined at a 135° angle to the panel section 16d. Panel section 16b extends outward from and is joined to the panel section 16c also at a 135° angle thereto. Panel section 16a extends outward from and is joined to the panel section 16b at a 135° angle thereto. The connection between the panel sections 16a, 16b, 16c and 16d creates one side of the bracket 10.

FIG. 1 also shows that panel sections 16f, 16g and 16h extend outward and are joined in a similar fashion from the panel section 16e as panel sections 16c, 16b and 16a, respectively, extend from the panel section 16d. The connection between the panel sections 16e, 16f, 16g and 16h create a second side of the bracket 10.

The angling of the outside corner panel sections 16d and 16e as well as their larger width enable easier mounting of the mounting bracket 10 to the outside corner 100 as shown in FIG. 1. The outside corner panel sections 16d and 16e also have a large circular aperture 20 formed in the center thereof that extends across a large part of the width of both of the outside corner panel sections 16d and 16e. Wires or cables can be run through the aperture 20 to allow for connection with a camera or other optical device (not shown).

In order to secure or attach the bracket 10 to the support structures as illustrated in FIGS. 1–6, a plurality of through apertures or holes 14 are placed in the upper and lower regions of the panel sections 16b–16g. Depending upon which support structure the mounting bracket 10 is secured or attached to, securing means or a securing device, such as screws 30, are inserted through holes 14 of selected panel sections securing the bracket 10 to the desired structure.

For example, with respect to the outside corner 100 of a support structure as shown in FIG. 1, screws 30 are inserted through holes 14 in the upper and lower regions of the outside corner panel sections 16d and 16e to secure the bracket 10 to the wall portions 102 and 104, respectively, of the outside corner 100.

Figure 2:
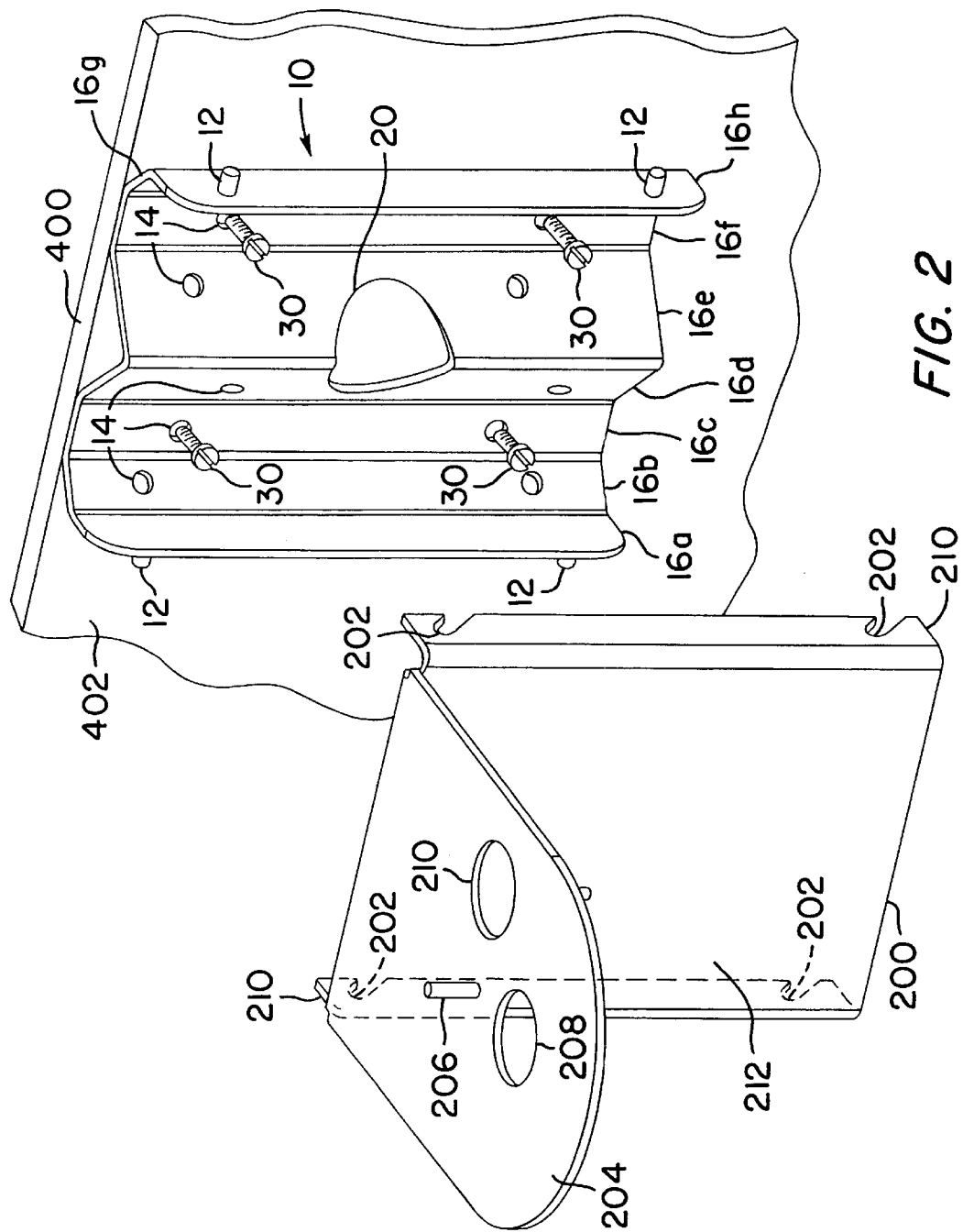
FIG. 2 shows a perspective view of the mounting racket of FIG. 1 along with a camera base positioned on a flat surface of a support structure.

If the mounting bracket 10 of the present invention is to be mounted to a planar wall section or flat wall, as shown in FIG. 2, second means or first and second planar panel sections 16c and 16f, which are substantially planar structures and arranged in a common vertical plane, can be positioned on the flat surface 402 of the flat wall 400. Screws 30 can then be inserted in holes 14 in the upper and lower regions of the panel sections 16c and 16f for securing the bracket 10 to the wall.

Figure 3:
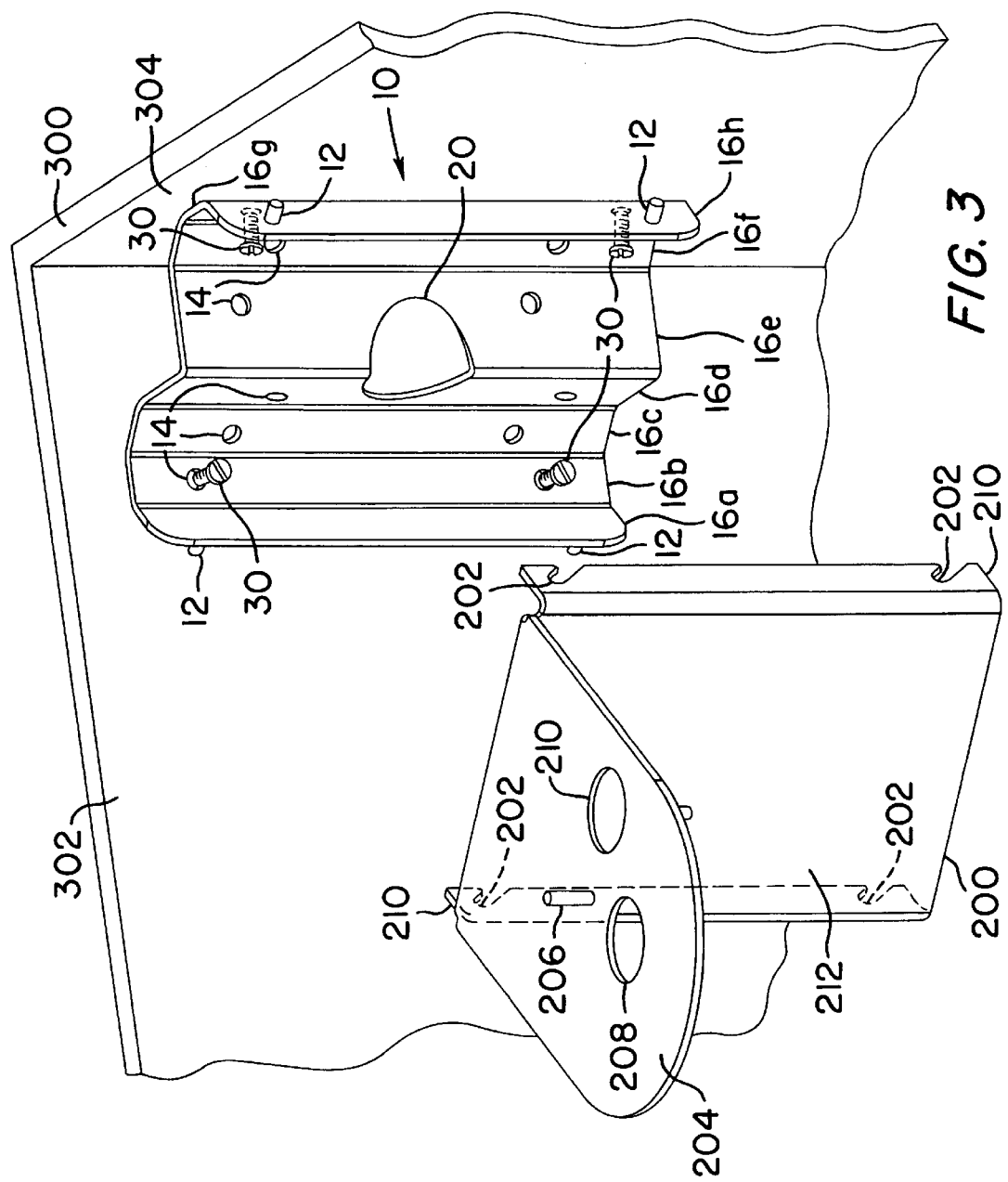
FIG. 3 shows a perspective view of the mounting bracket of FIG. 1 along with a camera base positioned on an inside corner of a support structure.

If, however, the mounting bracket 10 is to be mounted to an inside wall corner, as shown in FIG. 3, third means or first and second inside corner panel sections 16b and 16g of the bracket 10 are positioned on wall portions 302 and 304, respectively, of the inside corner 300 to form a convex right-angled structure. Screws 30 can then be inserted in the holes 14 in the upper and lower regions of the panel sections 16b and 16g to secure the bracket 10 to the wall portions.

Once the mounting bracket 10 has been mounted to the desired support structure, supporting means or a camera support or base for supporting the video surveillance camera can then be attached to the bracket 10. An example of one type of a camera support or base 200 is shown in FIGS. 1–3.

With reference to FIG. 1, a camera base 200 comprises a support or vertical mounting plate 212 with a lip or platform 204 extending horizontally from the top of the plate 212. The vertical mounting plate 212 also has vertical side sections 210 that are angled from and extend rearwardly from the plate 212. Engaging means or a plurality of slots 202 are formed in the upper and lower portions of the side sections 210 for attaching the camera base 200 to the mounting bracket 10. Fourth means or first and second attachment panel sections 16a are provided on the bracket 10 for permitting attachment of the camera base 200 to the bracket 10. Attaching means or an attaching device, such as attachment pins 12, are located on the backside of the bracket 10 in the upper and lower regions of the attachment panel sections 16a and 16h for slidable engagement with the corresponding slots in the side sections 210 of the base 200.

The camera base 200 of FIGS. 1–3 is also provided with a pin 206 positioned on its platform 204 for insertion into a camera body (not shown) to position the camera on the camera base 200. Apertures 208 and 210 are also formed in the platform 204 to enable wiring or cabling to be passed therethrough to connect the camera to a video surveillance system (not shown) or other video image communicating means.

Figure 4:
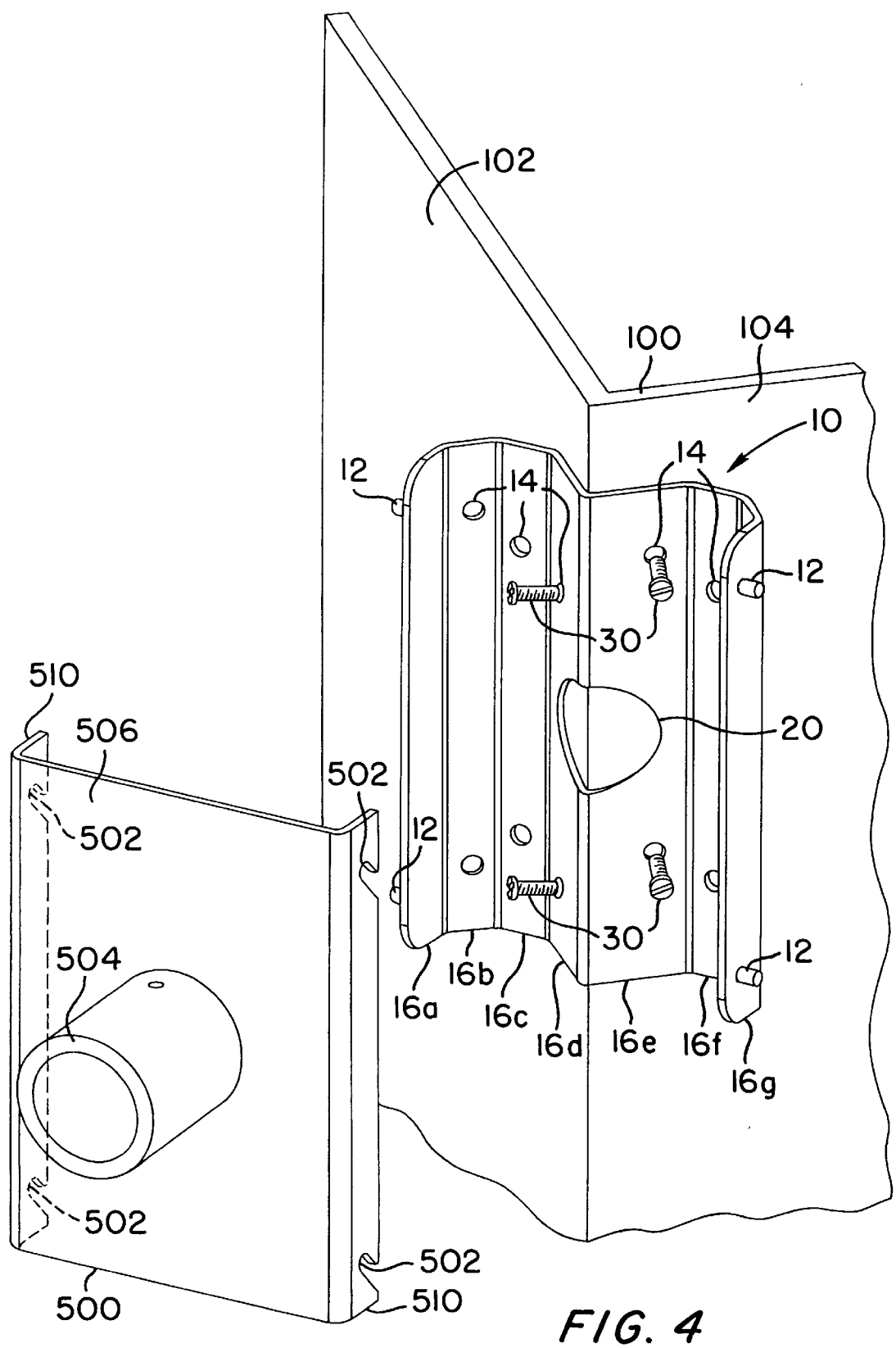
FIG. 4 shows a perspective view of the mounting bracket of FIG. 1 along with another camera base positioned on an outside corner of a support structure.
Figure 5:
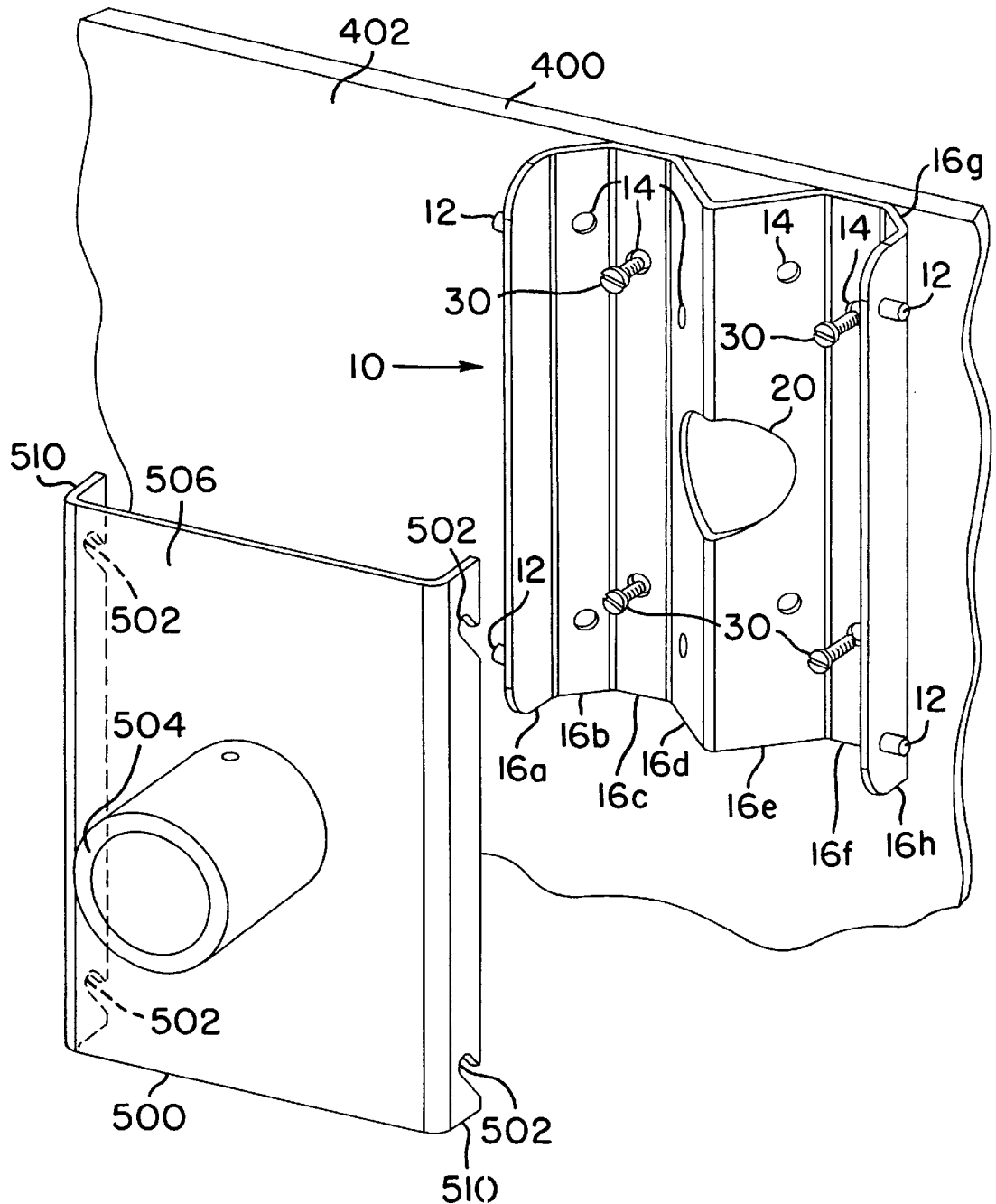
FIG. 5 shows a perspective view of the mounting bracket of FIG. 1 along with another camera base positioned on a flat surface of a support structure.
Figure 6:
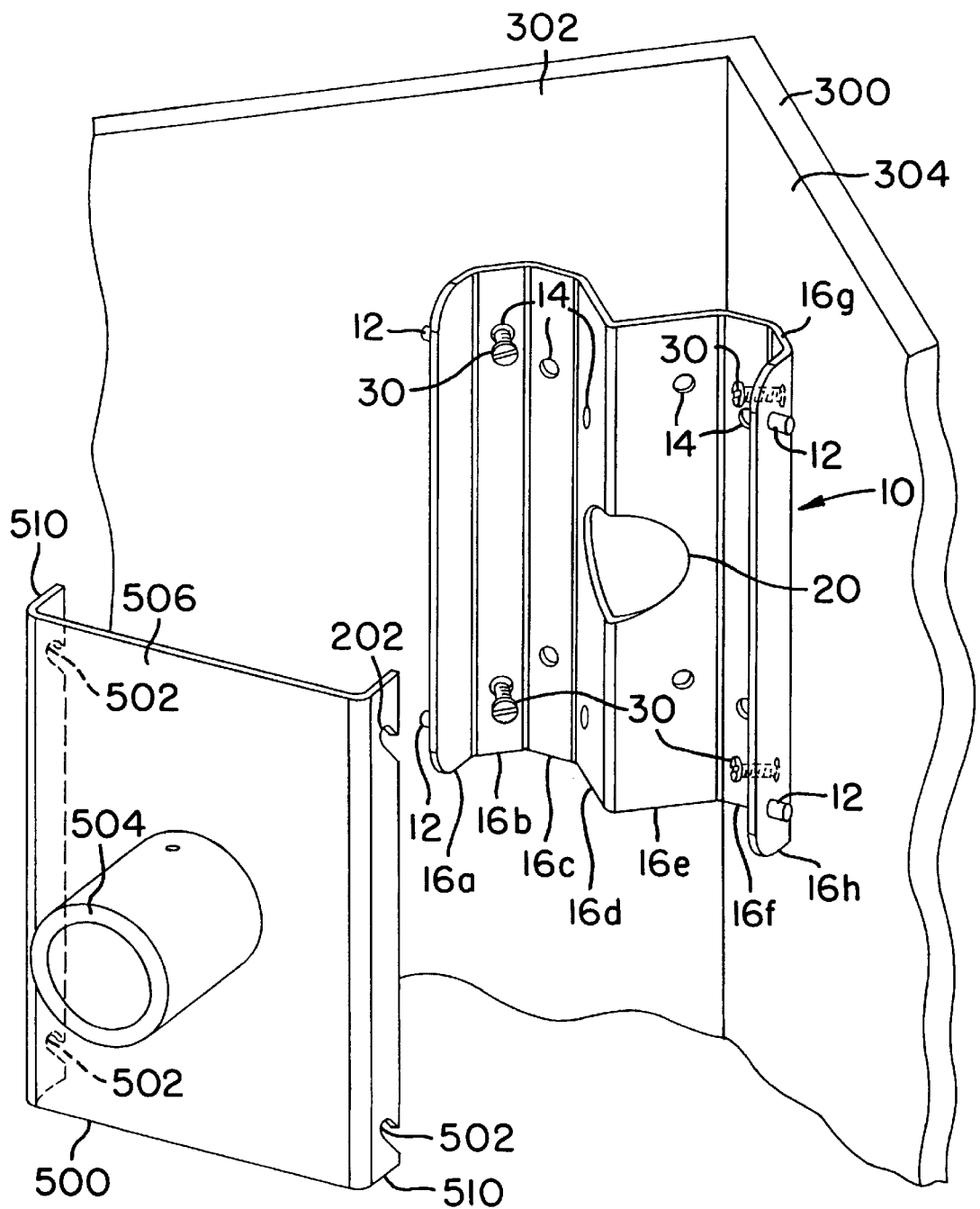
FIG. 6 shows a perspective view of the mounting bracket of FIG. 1 along with another camera base positioned on an inside corner of a support structure.

FIGS. 4–6 illustrate another type of camera base to be used with the mounting bracket 10. Camera base 500, similar to camera base 200, has a vertical plate 506, vertical side sections 510 angled and extending therefrom and slots 502 formed in the upper and lower portions of the side sections 510 for engagement with the attachment pins 12 of the mounting bracket 10. The camera base 500 also has a barrel 504 that permits a pole (not shown) or other connecting means to be inserted therein. A surveillance camera (not shown) may then be mounted on the pole. Wires can then be inserted through the aperture 20 in the bracket 10 and through the barrel 504 of the camera base 500 for connection to the camera.

The mounting bracket 10, as illustrated, is a one-piece member. The bracket 10, however, is not limited to the present illustrated embodiment as shown in FIGS. 1–6 but may be a variety of different sizes and shapes depending on its intended use and the type of camera it needs to support. The panel sections 16a–16h of the bracket 10 may be any size or dimension that permits for versatility in mounting to different support structures or surfaces.

It will be appreciated that the mounting bracket 10 can also be a variety of different types of materials. For example in the preferred embodiment, the material for the mounting bracket is 14 gauge cold-rolled galvanized steel. Other types of metals or plastics can also be used. The mounting bracket 10 of the present invention has a somewhat flexible structure to help make it adaptable to irregularities in surfaces to which it may be attached as well as irregularities in structural alignments, such as oddly angled walls, uneven ceilings or jointed columns. The mounting bracket 10 can also be of a rigid construction.

As illustrated in FIGS. 1–6, the mounting bracket 10 of the present invention engages with a camera base 200 or 500 to provide support for a surveillance camera. The mounting bracket 10 of the present invention, however, is not limited to the illustrated embodiments but may engage and attach to any variety of camera bases or other items that are desired to be mounted to a support structure. Further, the mounting bracket 10 may be integrally combined with a camera base to form a one piece unit. The bracket 10 may also be attached or incorporated with an attachment that then further connects with a camera base. Additionally, any number of brackets 10 can be used and arranged to provide mounting means for any number of surveillance cameras. For example, two or more bracket can be positioned and secured vertically as well as side-by-side along a support structure.

The manner in which the mounting bracket 10 is secured or attached to a support structure is also not limited to the through apertures 14 and screws 30 as illustrated in FIGS. 1–6. The apertures 14 may be located throughout the bracket and in any type of configuration needed for positioning and/or mounting the bracket to a support structure. Securing means 30 may also include hooks, anchors, bolts, nails or other types of attaching or securing mechanisms. The mounting bracket 10 may also be adhered to a support structure by glue, epoxy, etc., or may have some type of securing or attaching device incorporated in the bracket 10 to allow it to be secured to the support structure.

In all cases it is understood that the above-described arrangements are merely illustrative of the many possible specific embodiments which represent applications of the present invention. Numerous and varied other configurations, can be readily devised in accordance with the principles of the present invention without departing from the spirit and scope of the invention.

What is claimed is:

1. A mounting bracket for mounting of a camera base, said mounting bracket comprising:

first means for defining a concave right-angled structure for selectively being fitted to an outside wall corner, said first means comprising first and second outside corner panel sections angled at 90° to each other;

second means for defining a substantially planar structure for selectively being fitted to a planar wall section, said second means comprising first and second planar panel sections connected to said first and second outside corner panel sections, respectively, and arranged in a common plane;

third means for defining a convex right-angled structure for selectively being fitted to an inside wall corner, said third means comprising first and second inside corner panel sections connected to said first and second planar panel sections, respectively, and angled at 90° to each other; and fourth means for engaging the camera base, said fourth means comprising first and second attachment panel sections for permitting attachment of the camera base and connected to said first and second inside corner panel sections, respectively, and arranged substantially parallel to each other.

2. A bracket in accordance with claim 1, further comprising securing means for securing at least said first and second outside corner panel sections or said first and second planar panel sections or said first and second inside corner panel sections to the surface of a support structure.

3. A bracket in accordance with claim 2, wherein each of said first and second outside corner panel sections, said first and second planar panel sections and said first and second inside corner panel sections includes at least one through aperture, said aperture extending from the front surface through the back surface of each panel section; and said securing means extends through the at least one aperture of the each panel section for securing the each panel section to the surface of the support structure.

4. A bracket in accordance with claim 3, wherein said first and second outside corner panel sections, said first and second planar panel sections, said first and second inside corner panel sections and said first and second attachment panel sections are oriented in respective directions normal to a common horizontal plane.

5. A mounting bracket for mounting of a camera base, comprising:

first and second panel sections, said panel sections being generally planar and vertically oriented and joined to each other at respective inner edges, and angled at substantially 90° with respect to each other;

third and fourth panel sections, generally planar and vertically oriented, and arranged in a common plane, said third panel section extending outwardly from an outer edge of said first panel section and angled at substantially 135° relative to said first panel section, said fourth panel section extending outwardly from an outer edge of said second panel section and angled at substantially 135° relative to said second panel section;

fifth and sixth panel sections, generally planar and vertically oriented, and arranged at substantially 90° relative to each other, said fifth panel section extending outwardly from an outer edge of said third panel section and angled at substantially 135° relative to said third panel section, said sixth panel section extending outwardly from an outer edge of said fourth panel section and angled at substantially 135° relative to said fourth panel section; and seventh and eighth panel sections, generally planar and vertically oriented, and arranged substantially parallel to and spaced from each other, said seventh panel section extending in a first direction from an outer edge of said fifth panel section and angled substantially 135° relative to said fifth panel section, said eighth panel section extending in said first direction from an outer edge of said sixth panel section and angled at substantially 135° relative to said sixth panel section;

each of said first, second, third, fourth, fifth and sixth panel sections having a pair of throughholes formed therein; and each of said seventh and eighth panels having a pair of pins extending outwardly therefrom, each of said pins of said seventh panel being substantially aligned with, and extending in an opposite direction relative to, a corresponding pin of said eighth panel.

6. A mounting bracket according to claim 5, wherein said third, fourth, fifth and sixth panels are substantially equal in area to each other; and said first and second panel sections are substantially equal in area to each other and are substantially larger in area than said third, fourth, fifth and sixth panel sections.

7. A bracket in accordance with claim 1, wherein said bracket is a one-piece member.

8. A camera mount for supporting a camera, said camera mount comprising:

supporting means for supporting the camera, said supporting means comprising a camera base, and mounting means comprising a mounting bracket; first means for defining a concave right-angled structure for selectively being fitted to an outside wall corner, said first means comprising first and second outside corner panel sections angled at 90° to each other; second means for defining a substantially planar structure for selectively being fitted to a planar wall section, said second means comprising first and second planar panel sections connected to said first and second outside corner panel sections, respectively, and arranged in a common plane; third means for defining a convex right-angled structure for selectively being fitted to an inside wall corner, said third means comprising first and second inside corner panel sections connected to said first and second planar panel sections, respectively, and angled at 90° to each other; and fourth means for engaging the supporting means, said fourth means comprising first and second attachment panel sections connected to said first and second inside corner panel sections, respectively, and arranged substantially parallel to each other and including attaching means for permitting attachment of the camera base to said mounting bracket.

9. A camera mount in accordance with claim 8, further comprising securing means for securing at least said first and second outside corner panel sections or said first and second planar panel sections or said first and second inside corner panel sections to the surface of a support structure.

10. A camera mount in accordance with claim 9, wherein each of said first and second outside corner panel sections, said first and second planar panel sections and said first and second inside corner panel sections includes at least one through aperture, said aperture extending from the front surface through the back surface of each panel section; and said securing means extends through the at least one aperture of the each panel section for securing the each panel section to the surface of the support structure.

11. A camera mount in accordance with claim 10, wherein said first and second outside corner panel sections, said first and second planar panel sections, said first and second inside corner panel sections and said first and second attachment panel sections are oriented in respective directions normal to a common horizontal plane.

12. A camera mount in accordance with claim 11, wherein said camera base includes a support plate for supporting a housing of the camera, said support plate having engaging means for engaging with the attaching means to attach the plate of the base to the mounting bracket, said engaging means comprising side sections angled and extending rearwardly from the plate and including a plurality of slots and said attaching means including attachment pins for slidable engagement with corresponding slots in said side sections.

13. A camera mount in accordance with claim 8, wherein said camera mount is a one-piece unit.

14. A camera mount for supporting a camera, said camera mount comprising:

a camera base for supporting the camera; and a mounting bracket comprising:

first and second panel sections, said panel sections being generally planar and vertically oriented and joined to each other at respective inner edges, and angled at substantially 90° with respect to each other;

third and fourth panel sections, generally planar and vertically oriented, and arranged in a common plane, said third panel section extending outwardly from an outer edge of said first panel section and angled at substantially 135° relative to said first panel section, said fourth panel section extending outwardly from an outer edge of said second panel section and angled at substantially 135° relative to said second panel section;

fifth and sixth panel sections, generally planar and vertically oriented, and arranged at substantially 90° relative to each other, said fifth panel section extending outwardly from an outer edge of said third panel section and angled at substantially 135° relative to said third panel section, said sixth panel section extending outwardly from an outer edge of said fourth panel section and angled at substantially 135° relative to said fourth panel section; and seventh and eighth panel sections, generally planar and vertically oriented, and arranged substantially parallel to and spaced from each other, said seventh panel section extending in a first direction from an outer edge of said fifth panel section and angled substantially 135° relative to said fifth panel section, said eighth panel section extending in said first direction from an outer edge of said sixth panel section and angled at substantially 135° relative to said sixth panel section;

each of said first, second, third, fourth, fifth and sixth panel sections having a pair of throughholes formed therein; and each of said seventh and eighth panels having a pair of pins extending outwardly therefrom, each of said pins of said seventh panel being substantially aligned with, and extending in an opposite direction relative to, a corresponding pin of said eighth panel.

15. A mounting bracket according to claim 14, wherein said third, fourth, fifth and sixth panels are substantially equal in area to each other; and said first and second panel sections are substantially equal in area to each other and are substantially larger in area than said third, fourth, fifth and sixth panel sections.

* * * * *